(12) United States Patent
Heo et al.

(10) Patent No.: US 9,513,123 B2
(45) Date of Patent: *Dec. 6, 2016

(54) LOCATION INFORMATION MANAGEMENT METHOD AND APPARATUS OF MOBILE TERMINAL

(71) Applicant: Samsung Electronics Co., Ltd., Suwon-si, Gyeonggi-do (KR)

(72) Inventors: Dong Kyu Heo, Suwon-si (KR); Jong Sun Pyo, Suwon-si (KR); Jae Hee Jung, Suwon-si (KR); Suk In Jung, Seoul (KR); Byoung Hoon Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,272

(22) Filed: Apr. 2, 2014

(65) Prior Publication Data

US 2014/0214315 A1    Jul. 31, 2014

Related U.S. Application Data

(63) Continuation of application No. 13/095,301, filed on Apr. 27, 2011, now Pat. No. 8,718,929.

(30) Foreign Application Priority Data

May 4, 2010 (KR) .................... 10-2010-0041659

(51) Int. Cl.
*G01C 21/00* (2006.01)
*G01C 21/36* (2006.01)
(Continued)

(52) U.S. Cl.
CPC .............. *G01C 21/00* (2013.01); *G01C 21/20* (2013.01); *G01C 21/3617* (2013.01); *G01C 21/3682* (2013.01); *H04W 4/02* (2013.01)

(58) Field of Classification Search
CPC ...................................................... G01C 21/00
(Continued)

(56) References Cited

U.S. PATENT DOCUMENTS 5,523,950 A    6/1996  Peterson
6,401,029 B1*  6/2002  Kubota et al. ................ 701/408
(Continued)

FOREIGN PATENT DOCUMENTS

CN    101334283 A    12/2008
KR    10-2003-0025099 A    3/2003
(Continued)

OTHER PUBLICATIONS

Garmin nuvi 5000 Manual, Feb. 2008.

*Primary Examiner* — Behrang Badii
*Assistant Examiner* — Michael Berns
(74) *Attorney, Agent, or Firm* — Jefferson IP Law, LLP

(57) ABSTRACT

A method and apparatus for managing location information of a mobile terminal are provided. The method includes obtaining one or more point sites associated with a movement characteristic of an electronic device, determining a current position of the electronic device, determining a route based on the current position and the one or more point sites, and presenting the route on a map via a display operably coupled to the electronic device.

14 Claims, 10 Drawing Sheets

(51) Int. Cl.
*G01C 21/20* (2006.01)
*H04W 4/02* (2009.01)

(58) Field of Classification Search
USPC ............ 701/424, 201, 410; 455/456.1, 456.6
See application file for complete search history.

(56) References Cited

U.S. PATENT DOCUMENTS

| | | | |
|---|---|---|---|
| 6,542,814 | B2 | 4/2003 | Polidi et al. |
| 7,133,775 | B2 * | 11/2006 | Adamski et al. ............. 701/438 |
| 7,187,997 | B2 | 3/2007 | Johnson |
| 7,233,861 | B2 * | 6/2007 | Van Buer et al. ............ 701/424 |
| 7,512,487 | B1 | 3/2009 | Golding et al. |
| 8,315,791 | B2 | 11/2012 | Bales et al. |
| 8,385,946 | B2 | 2/2013 | Forstall et al. |
| 2003/0036848 | A1 | 2/2003 | Sheha et al. |
| 2004/0243307 | A1 | 12/2004 | Geelen |
| 2006/0173841 | A1 * | 8/2006 | Bill ................................... 707/6 |
| 2007/0027628 | A1 | 2/2007 | Geelen |
| 2008/0027639 | A1 * | 1/2008 | Tryon ........................... 701/209 |
| 2008/0248815 | A1 | 10/2008 | Busch |
| 2008/0268876 | A1 | 10/2008 | Gelfand et al. |
| 2009/0005082 | A1 | 1/2009 | Forstall et al. |
| 2009/0005929 | A1 | 1/2009 | Nakao et al. |
| 2009/0315995 | A1 | 12/2009 | Khosravy et al. |
| 2011/0055204 | A1 | 3/2011 | Jung |

FOREIGN PATENT DOCUMENTS

| | | |
|---|---|---|
| KR | 2003-0069770 A | 8/2003 |
| KR | 10-2009-0053627 A | 5/2009 |
| KR | 10-2011-0024324 A | 3/2011 |
| WO | 2008066242 A1 | 6/2008 |

* cited by examiner

LOCATION INFORMATION MANAGEMENT METHOD AND APPARATUS OF MOBILE TERMINAL

PRIORITY

This application is a continuation of U.S. patent application Ser. No. 13/095,301, filed on Apr. 27, 2011, which claims the benefit under 35 U.S.C. §119(a) of a Korean patent application filed on May 4, 2010 in the Korean Intellectual Property Office and assigned Serial No. 10-2010-0041659, the entire disclosure of which is hereby incorporated by reference.

BACKGROUND OF THE INVENTION

1. Field of the Invention

The present invention relates to a mobile terminal. More particularly, the present invention relates to a method and apparatus for managing location information of a mobile terminal.

2. Description of the Related Art

Mobile terminals of the related art now integrate various supplementary functions. For example, a mobile terminal can now support a messaging function, a wireless Internet access function, a phonebook function, a schedule organizer function, a navigation function, etc. More particularly, a mobile terminal may be equipped with the navigation function which provides the terminal's user with location information in a location search mode. The location information can include ambient information about a location and a route from a current location to a destination location.

Such a mobile terminal of the related art is configured to provide the usual location information. For example, in the navigation mode, the mobile terminal of the related art may provide information on a shortest route and a roundabout route from the current location to a destination location, but not any user-specific information about a user's favorite routes. Also, the mobile terminal of the related art lacks features such as, for example, selective information feedback for providing the user with ambient information regarding local objects such as parks, hospitals, shopping centers, and restaurants selectively according to the user's preference. This restricts the terminal user from using the location information more efficiently. That is, the mobile terminal of the related art is disadvantageous in that the location information acquired by its navigation function is used inefficiently. There is therefore a need to develop a method for improving the usability of the location information.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for managing location information of a mobile terminal.

In accordance with an aspect of the present invention, a method for managing location information is provided. The method includes determining location information of a current position while in a Global Positioning System (GPS) reception mode, checking at least one of preference routes and interest sites within an interest area in a vicinity of the current position, and presenting at least one of the preference routes and interest sites on a map.

In accordance with another aspect of the present invention, an apparatus for managing location information is provided. The apparatus includes a GPS module for receiving GPS data while in a GPS reception mode, a control unit for determining location information of a current position by analyzing the GPS data, a memory unit for saving at least one of preference routes and interest sites within an interest area in a vicinity of the current position, and a presentation unit for presenting at least one of the preference routes and interest sites on a map.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
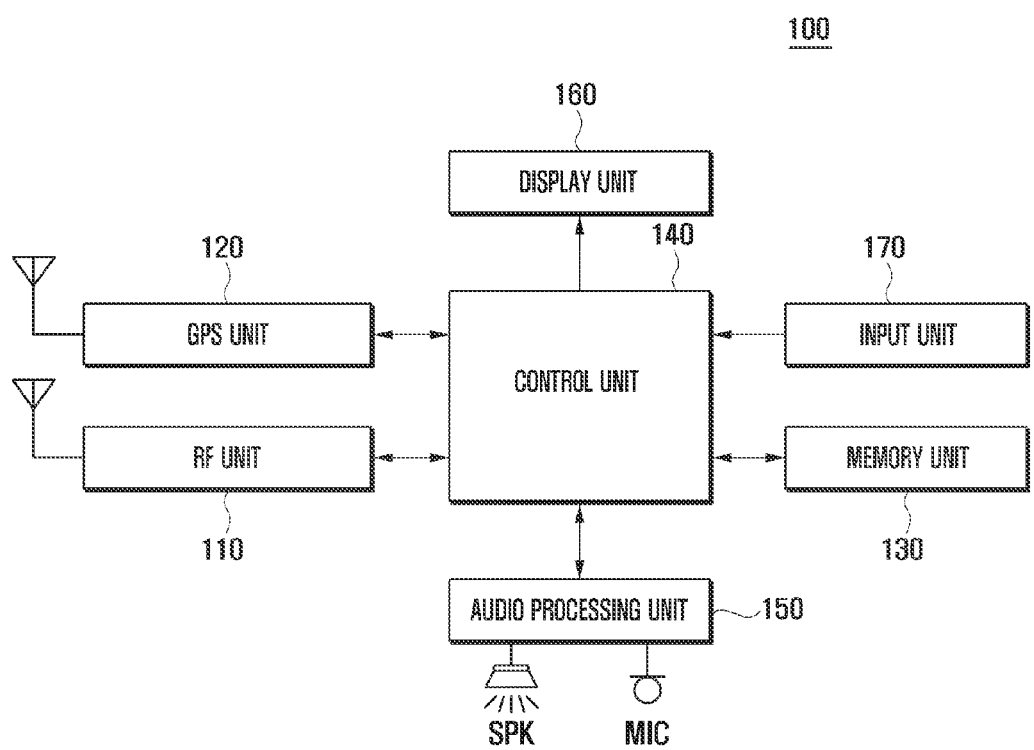
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the term "location information" denotes information that corresponds to a location and is managed in the mobile terminal. The location information may include coordinates and time data. The location information may further include velocity data at a specific location selectively. Here, the velocity data denotes a passing speed of the mobile terminal at the corresponding location. The term "point" denotes a location. The term "point site" denotes a location which the mobile terminal has passed. The term "preference route" denotes a route connecting the current location to the point site. That is, the point site can be regarded as an intermediate destination through which the mobile terminal travels to a final destination. At this time, the point site may include a stop point, a route point, and a turning point.

The term "stop point" denotes a location where the mobile terminal remained for a period of time. The term "stop period" denotes a time duration for determining a stop point. The term "stop region" denotes an area within a predetermined radius. The term "route point" denotes a location on a predicted route through which the mobile terminal is predicted to pass. That is, the predicted route can be presented as a combination of route points. The term "turning point" denotes a location which is selected from the route points and at which a movement direction of the mobile terminal changed on the predicted route by more than a predetermined threshold amount.

The term "interest area" denotes an area where the terminal user wants to perform a search. Here, the interest area includes locations within a predetermined radius of a certain point. The term "interest site" denotes a location determined in accordance with search criteria when the mobile terminal performs searching of the interest area. For example, the interest site may be a hospital, a drugstore, a park, a public office, a restaurant, a theatre, a shopping center, etc. The term "interest information" denotes information associated with the interest site and provided selectively. For example, the interest information may include a phone number, an email address, a homepage address, a coupon, etc.

Figure 2:
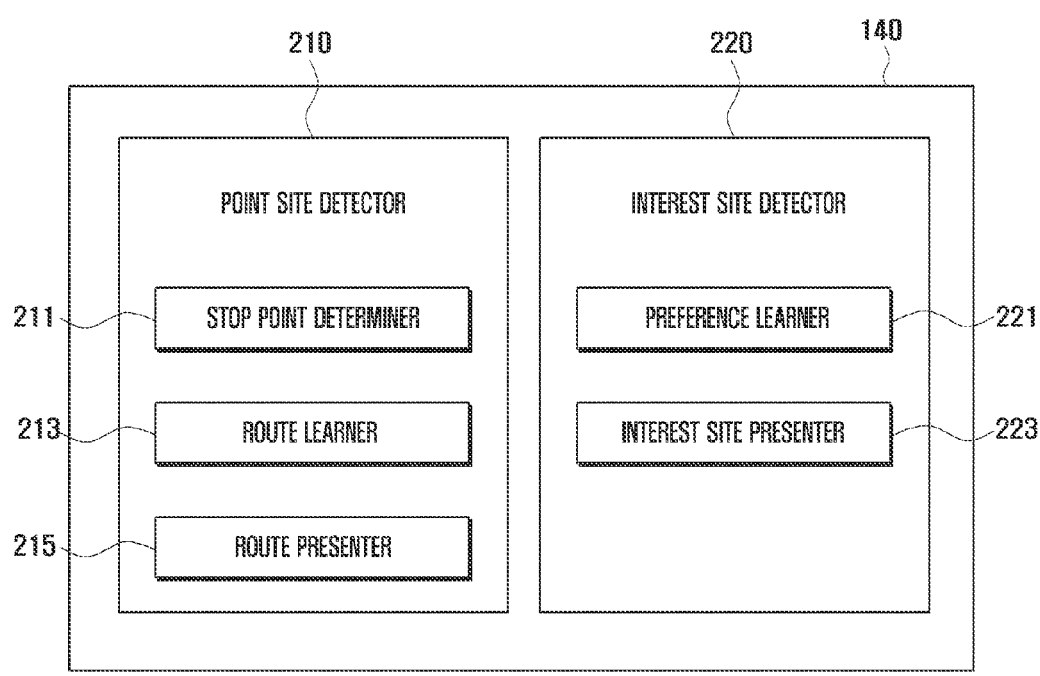
FIG. 2 is a block diagram illustrating an internal configuration of a control unit of FIG. 1 according to an exemplary embodiment of the present invention.
Figure 10:
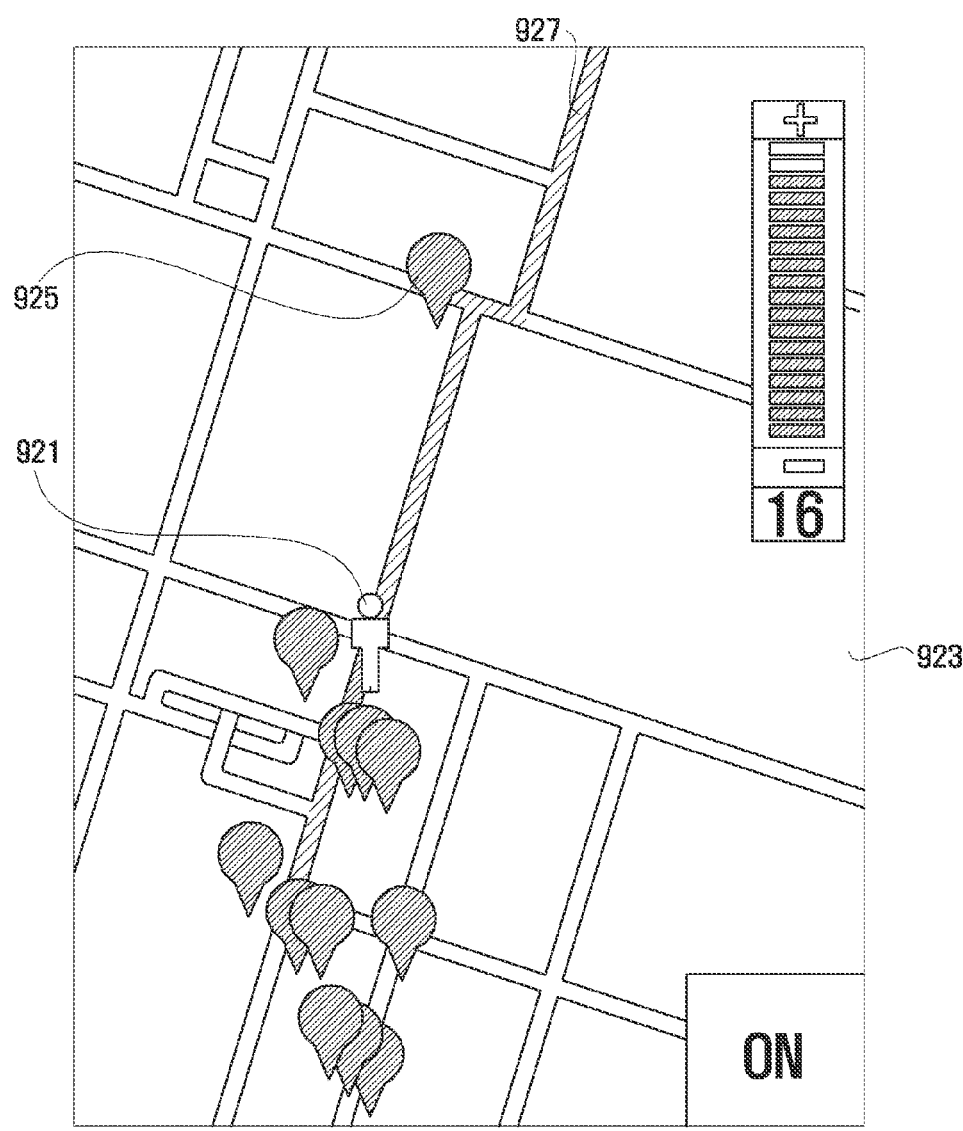
FIG. 10 is a diagram illustrating an exemplary screen image for explaining a principle of the router presentation procedure of FIG. 3 according to an exemplary embodiment of the present invention.

FIG. 1 is a block diagram illustrating a configuration of a mobile terminal according to an exemplary embodiment of the present invention. FIG. 2 is a block diagram illustrating an internal configuration of a control unit of FIG. 1 according to an exemplary embodiment of the present invention. FIG. 10 is a diagram illustrating an exemplary screen image for explaining a principle of the router presentation procedure of FIG. 3 according to an exemplary embodiment of the present invention. In this exemplary embodiment, the description is directed to a mobile phone as a representative mobile terminal.

Referring to FIG. 1, the mobile terminal 100 includes a Radio Frequency (RF) unit 110, a Global Positioning System (GPS) unit 120, a memory unit 130, a control unit 140, an audio processing unit 150, a display unit 160, and an input unit 170.

The RF unit 110 is responsible for radio communication of the mobile terminal 100. The RF unit 110 may include an RF transmitter for up-converting and amplifying a transmit signal and an RF receiver for low noise amplifying and down-converting a received signal.

The GPS unit 120 is responsible for receiving GPS data from the GPS satellites. Here, the GPS is the global positioning system that uses 24 GPS satellites orbiting about at 20.183 km.

The memory unit 130 may include a program memory and a data memory. The program memory stores programs necessary for controlling general operations of the mobile terminal 100. The program memory also stores programs for managing location information according to an exemplary embodiment of the present invention. The data memory stores data generated when the programs are running. The memory unit 130 stores the location information according to an exemplary embodiment of the present invention. Here, the memory unit 130 stores the location information including at least one of a point site and an interest site.

The control unit 140 controls operations of the mobile terminal 100. The control unit 140 may include a data processing unit comprising a transmitter for encoding and modulating the transmit signal and a receiver for demodulating and decoding the received signal. The data processing unit may include a Modulator-Demodulator (modem) and a Coder-Decoder (codec) pack. The codec pack can include a data codec for processing packet data and an audio codec for processing an audio signal including voice. The control unit 140 executes a GPS reception mode by means of the GPS unit 120 according to an exemplary embodiment of the present invention. The control unit 120 analyzes GPS data and determines location information of a current location based on the analysis result. The control unit 140 determines location information of a current location periodically and saves the location information in the memory unit 130. The control unit 140 also registers a point site or an interest site with the memory unit 130. The control unit 140 also determines an interest site and provides the interest site information. For this purpose, the control unit 140 may include a point site detector 210 and an interest site detector 220.

The point site detector 210 analyzes location information stored in the memory unit 130 to retrieve and register a point site, and to use the registered point site. The point site detector 210 may be provided with a stop point determiner 211, a route learner 213, and a route presenter 215. The stop point determiner determines a stop point in accordance with a tarry time. The route learner 213 determines a predicted route and extracts a turning point from the predicted route. The route presenter 215 selects a point site according to the current location and provides a preference route connecting the current location and the point site.

The interest site detector 220 analyzes an event for searching for an interest site to determine and register the interest site and a preference level of the interest site, and utilizes the registered interest site. The interest site detector 220 may be provided with a preference learner 221 and an interest site presenter 223. The preference learner 221 analyzes the interest site to determine the preference level of the interest site. The interest site presenter 223 selects an interest site based on the preference level and provides information of the selected interest site.

The audio processing unit 150 processes a received audio signal from the audio codec of the data processing unit so as to output through a speaker (SPK) and transports a transmit audio signal input through a microphone (MIC) to the audio codec of the data processing unit.

The display unit 160 displays an operating status of the mobile terminal 100 under the control of the control unit 140. The display unit 160 may be implemented with a Liquid Crystal Display (LCD) and, in this case, may include an LCD controller, a video memory for storing video data, and LCD devices. The LCD may be implemented with a touch-screen function and, in this case, may comprise a part of the input unit 170.

The input unit 170 may be provided with a plurality of alphanumeric keys for inputting alphabetic and numeric information and a plurality of function keys for configuring various functions of the mobile terminal.

Figure 3:
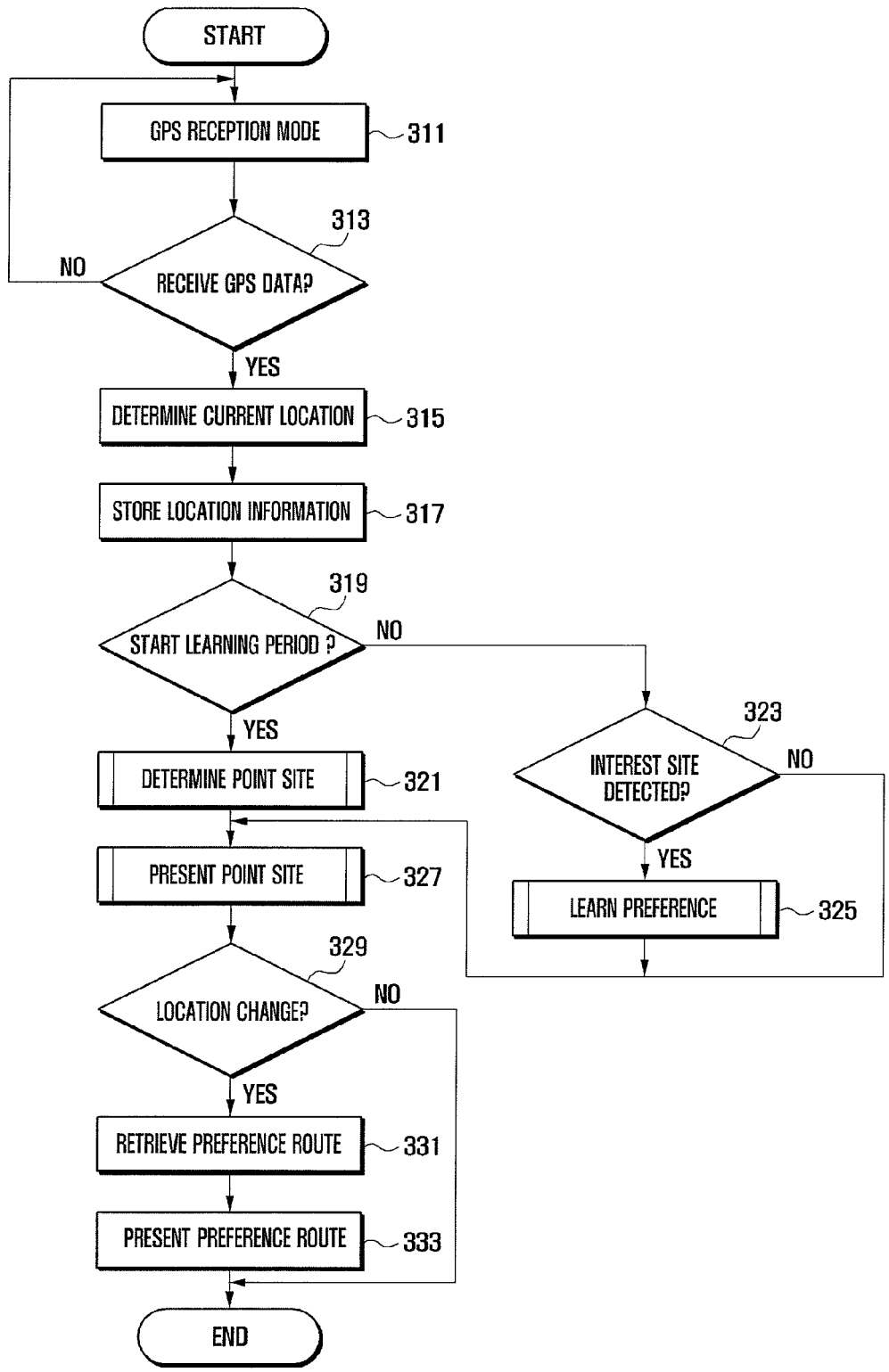
FIG. 3 is a flowchart illustrating a location information management method for a mobile terminal according to an exemplary embodiment of the present invention.

FIG. 3 is a flowchart illustrating a location information management method for a mobile terminal according to an exemplary embodiment of the present invention.

Referring to FIG. 3, in the location information management method depicted, the control unit 140 first executes the GPS reception mode at step 311. If GPS data is received by means of the GPS unit 120, the control unit 140 detects the receipt of the GPS data at step 313 and determines a current location based on the GPS data at step 315. That is, the control unit 140 analyzes the GPS data and determines the current location based on the analysis result. The control unit 140 stores the location information in the memory unit 130 at step 317.

Next, the control unit 140 determines whether a learning period has started at step 319 and, if the learning period is determined to have started, executes a point site determination procedure at step 321. At this time, the control unit 140 analyzes the location information collected during the learning period. The control unit 140 can determine a stop point. The control unit 140 can also determine a turning point through a route learning process. The point site determination procedure is described hereinafter in more detail.

Figure 4:
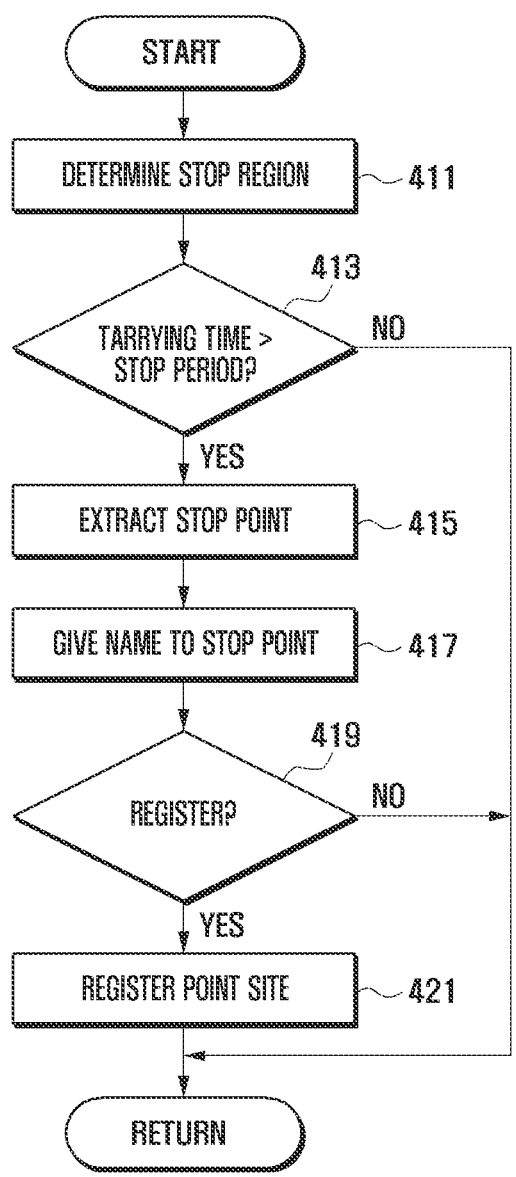
FIG. 4 is a flowchart illustrating a point site determination procedure of FIG. 3 according to an exemplary embodiment of the present invention.

FIG. 4 is a flowchart illustrating a point site determination procedure of FIG. 3 according to an exemplary embodiment of the present invention.

Referring to FIG. 4, in the point site determination procedure depicted, the control unit 140 first determines a stop region at step 411. Here, the control unit 140 compares coordinates of location information. Next, the control unit 140 determines the stop region by combining location information in which a distance between the coordinates is less than a threshold value. Next, the control unit determines whether a tarrying time of the mobile terminal exceeds a predetermined stop period at step 413. That is, the control unit 140 continues comparing the time data in location information within the stop region. The control unit 140 also continues collecting the time data and compares the time data with the stop period.

If the tarrying time of the mobile terminal is determined to exceed the stop period at step 413, the control unit 140 extracts at least one stop point within the stop region at step 415. That is, the control unit 140 selects a stop point based on the location information collected within the stop region. Next, the control unit 140 assigns a name of the stop point at step 417. At this time, the control unit 140 collects ambient information at the stop point in map data and assigns a name to the stop point in accordance with the ambient information. The control unit 140 can control the display unit 160 to display a message prompting the terminal user to assign a name to the stop point. The control unit 140 can designate the text input by means of the input unit 170 as the name of the stop point.

The control unit 140 determines whether to register the stop point at step 419. At this time, the control unit 140 can determine whether the stop point is already registered in the memory unit 130. The control unit 140 also can control the display unit 160 to display a message prompting the terminal user to decide whether to register the stop point. The control unit 140 can determine whether to register the stop point according to a user's input through the input unit 170. If it is determined to register the stop point at step 419, the control unit 140 registers the stop point as a point site at step 421. That is, the control unit 140 saves the location information on the stop point in the storage unit 130. Finally, the control unit 140 ends the stop point determination procedure and returns to the next step 327 in FIG. 3.

If the tarrying time of the mobile terminal is determined not to exceed the stop period at step 413 or if it is determined not to register the stop point at step 419, the control unit 140 ends the stop point determination procedure and returns to the next step 327 in FIG. 3.

Figure 5:
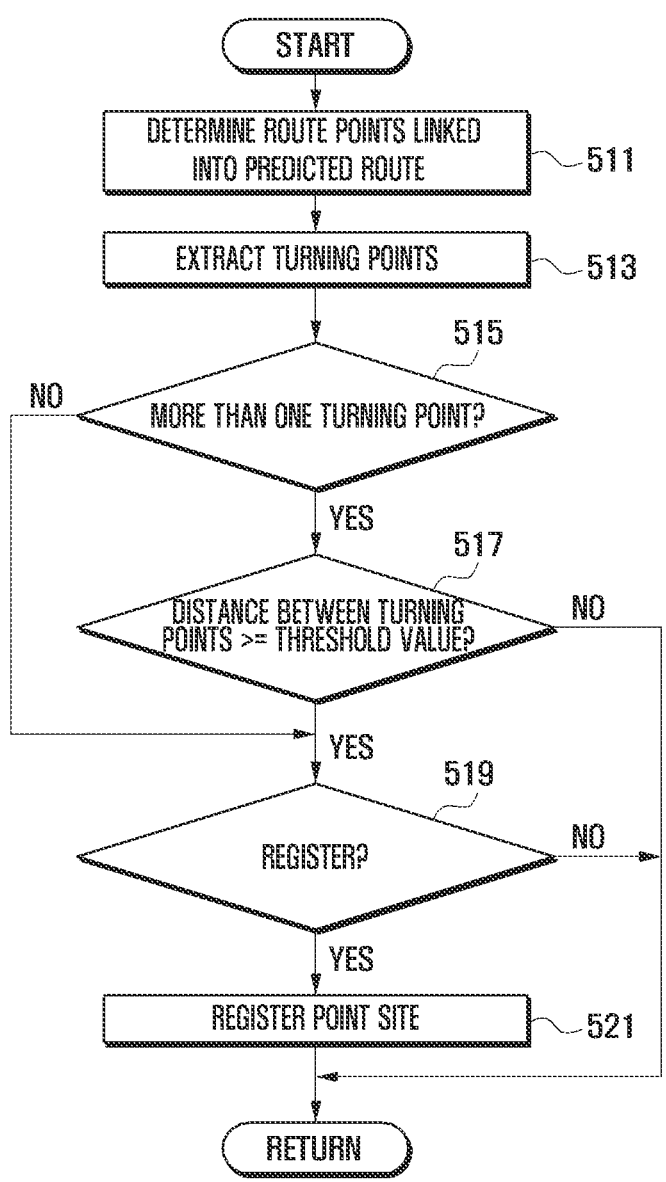
FIG. 5 is a flowchart illustrating a route learning procedure of FIG. 3 according to an exemplary embodiment of the present invention.
Figure 6:
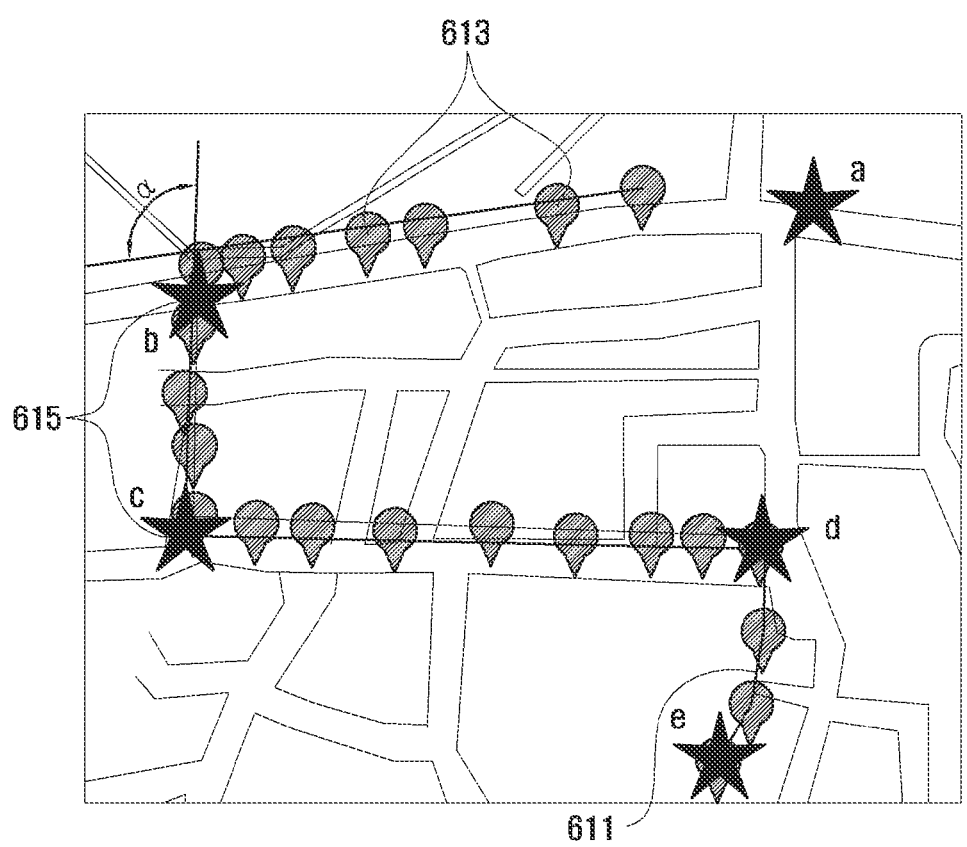
FIG. 6 is a diagram illustrating an exemplary screen image for explaining a principle of the route learning procedure of FIG. 5 according to an exemplary embodiment of the present invention.

FIG. 5 is a flowchart illustrating a route learning procedure of FIG. 3 according to an exemplary embodiment of the present invention. FIG. 6 is a diagram illustrating an exemplary screen image for explaining a principle of the route learning procedure of FIG. 5 according to an exemplary embodiment of the present invention.

Referring to FIGS. 5 and 6, in the route learning procedure depicted, the control unit 140 first determines route points 613 that are linked into a predicted route 611 at step 511. For this purpose, the control unit 140 compares the coordinates data and time data of the location information. The time data is connected regularly, and the control unit 140 determines the predicted route 611 with the combination of the location information of which coordinate data is linked in synchronization with the time data. The control unit 140 also determines positions on the predicted route 611 as the route points 613. Next, the control unit 140 extracts at least one turning point 615 among the route points 613 at step 513. In order to detect a turning point 615, the control unit 140 determines whether an absolute angle ($\alpha$) formed between two path segments linked at a route point, each path segment being formed by connecting another route point contiguous in time to the linking route point, is greater than a threshold angle. If the absolute angle ($\alpha$) is greater than the threshold angle, the control unit 140 determines the linking route point as the turning point 615.

Next, the control unit 140 determines whether multiple turning points 615 are detected at step 515. If multiple turning points 615 are detected, the control unit 140 determines whether the distance between two turning points 615 is equal to or greater than a threshold value at step 517. If only one turning point is detected at step 515 or if the distance between the two turning points is determined to be equal to or greater than the threshold value at step 517, the control unit 140 determines whether to register the turning point at step 519. At this time, the control unit 140 can check whether the turning point 615 is already registered in the memory unit 130. The control unit 140 can also control the display unit 160 to display a message prompting the terminal user to determine whether to confirm the registration of the turning point. The control unit 140 can determine whether to register the turning point 615 according to a user input by means of the input unit 170.

If it is determined to register the turning point at step 519, the control unit 140 registers the turning point 615 as a point site at step 521. If it is determined that the turning point 615 is not registered in the memory unit 130, the control unit 140 registers the turning point 615. That is, the control unit 140 saves the location information of the turning point 615 in the memory unit 130. Finally, the control unit 140 ends the route learning procedure and returns to the next step in FIG. 3.

Otherwise, if the distance between the two turning points is less than the threshold value at step 517 or if it is not determined to register the turning point at step 519, the control unit 140 ends the route learning procedure and returns to the next step in FIG. 3. At this time, the control unit 140 can delete the location information collected for the learning period.

If it is not determined that the learning period has started at step 319, the control unit 140 determines whether an interest site is detected at step 323 and, if it is determined that an interest site is detected at step 323, performs a preference learning procedure at step 325. At this time, the control unit 140 determines a preference level of the corresponding interest site. Table 1 shows items representing the events related to the detection of the interest sites that are stored in the memory unit 130. The preference learning procedure of the control unit 140 will be described in more detail hereinafter.

TABLE 1

| Item | Description |
| --- | --- |
| PREF_DEG_SEARCH_MAP | Select interest site |
| PREF_DEG_SEARCH_DETAIL | Display interest information of interest site |
| PREF_DEG_SEARCH_CALL | Place call to interest site |
| PREF_DEG_SEARCH_NET | access interest site via Internet |
| PREF_DEG_DOWNLOAD_COUPON | Download coupon of interest site |
| PREF_DEG_VISIT_BYNAVI | Display route to interest site |
| PREF_DEG_VISIT_SIMPLE | Visit interest site |
| PREF_DEG_VISIT_BYPAY | Pay at interest site |

Figure 7:
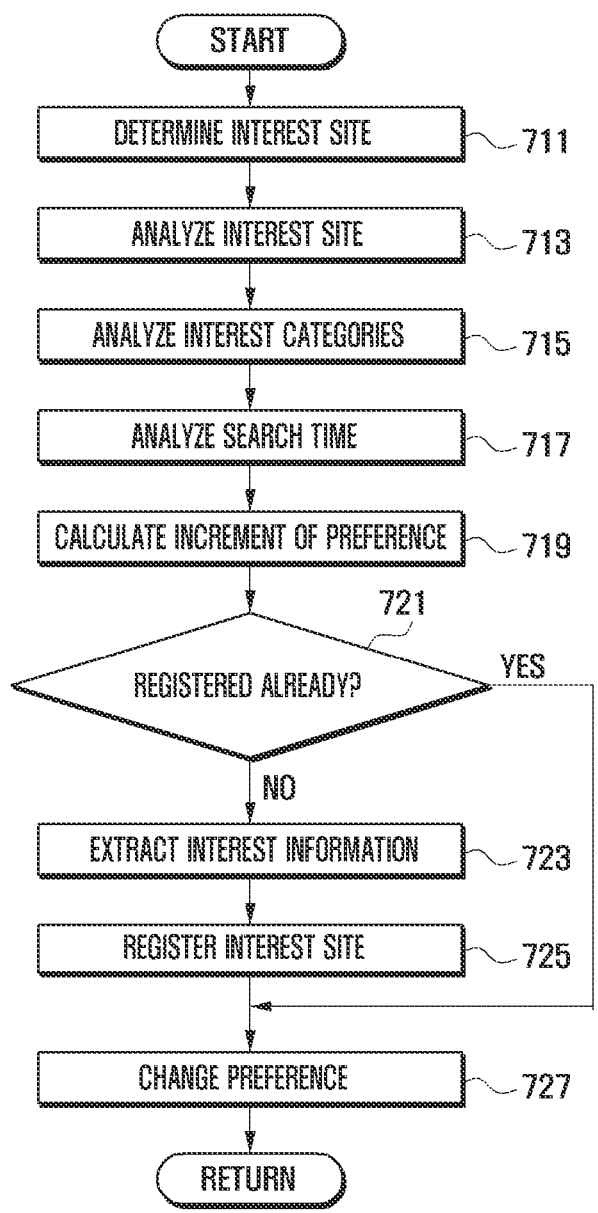
FIG. 7 is a flowchart illustrating a preference learning procedure of FIG. 3 according to an exemplary embodiment of the present invention.

FIG. 7 is a flowchart illustrating a preference learning procedure of FIG. 3 according to an exemplary embodiment of the present invention.

Referring to FIG. 7, in the preference learning procedure depicted, the control unit 140 first determines an interest site at step 711. Next, the control unit 140 analyzes the interest site at step 713. At this time, the control unit 140 can determine an interest area around the interest site. Next, the control unit 140 checks location information about the interest area. Here, the control unit 140 can determine a place, e.g., Myongdong, Gangnam, or Suwon, corresponding to the interest area. Next, the control unit 140 analyzes an interest category at step 715. That is, the control unit 140 categorizes the interest information according to interest categories comprising at least one layer. Interest categories classified on a first layer can be stored in the memory unit 130 as shown in Table 2. The interest categories also can be further classified on a second layer and stored in the memory unit as shown in Table 3.

TABLE 2

| First layer |
| --- |
| Auto Service |
| Bank |
| Business |
| Community |
| Eating and Drinking |
| Accommodation |
| Health and Medical |
| Shopping |
| Tourist Attraction |
| Transport |
| Leisure and Sports |
| Restaurant |

TABLE 3

| Second layer |
| --- |
| Bowling Center |
| Casino |
| Cinema |
| Golf Course |
| Ice Skating Rink |
| Marina |
| Public Sport Airport |
| Recreation Facility |
| Ski Resort |
| Sports Activity |
| Sports Center |

Next, the control unit 140 analyzes a search time at step 717. At this time, the control unit 140 can check a start time or an end time of a search for an interest site. Here, the control unit 140 can classify the search time into interest times, e.g. weekend and weekday, morning and afternoon, or before and after work hours. Next, the control unit calculates an increment of preference on the interest site at step 719. At this time, the control unit 140 can calculate the increment of preference on the interest site by applying a weight determined according to at least one of the item, interest area, interest category, and interest time. For example, the control unit 140 might apply a higher weight to the 'PREF_DEG_VISIT_SIMPLE' or 'PREF_DEG_VISIT_BYPAY' as compared to other items among the search event items. If the interest area is a location such as 'Myongdong', the control unit 140 might apply a higher weight to 'weekend' as compared to 'weekday' in the search time. Similarly, if the interest area is 'Soowon', the control unit 140 might apply a higher weight to 'Restaurant' in the interest category.

Next, the control unit determines whether the interest site has already been registered at step 721. If it is not determined that the interest site has been registered, the control unit 140 extracts the interest information at step 723. That is, the control unit 140 retrieves the interest information about the interest site from the memory unit 130 or accesses an external server (not shown) to retrieve the interest information about the interest site. Next, the control unit 140 registers the interest site at step 725. After registering the interest site, the control unit 140 registers the preference level by reflecting the increment of the preference on the interest site at step 727. That is, the control unit 140 saves the interest site and the preference of the interest site in the memory unit 130. Finally, the control unit 140 ends the preference learning procedure and returns to the next step 327 of FIG. 3.

If it is determined at step 721 that the interest site has been registered, the control unit 140 changes the preference by reflecting the increment of the preference of the interest site at step 727. That is, the control unit 140 updates the preference of the interest site in the memory unit 130. Finally, the control unit 140 ends the preference learning procedure and returns to the next step 327 of FIG. 3.

At the next step, the control unit 140 performs an interest site presentation procedure at step 327. Here, the control unit 140 determines an interest area and presents an interest site within the interest area. The interest site can be stored in the memory unit 130 as shown in Table 4. The interest site presentation procedure is described hereinafter in more detail.

TABLE 4

| Interest site | Interest area | Interest cat. | Interest time | Interest info. |
|---|---|---|---|---|
| $(x_1, y_1, z_1)$ | Myongdong | Shopping | Weekend/afternoon | 00-000-0000 |
| $(x_2, y_2, z_2)$ | Soowon | Restaurant | Weekday/afternoon | 11-111-1111 |
| — | — | — | — | — |
| — | — | — | — | — |

Figure 8:
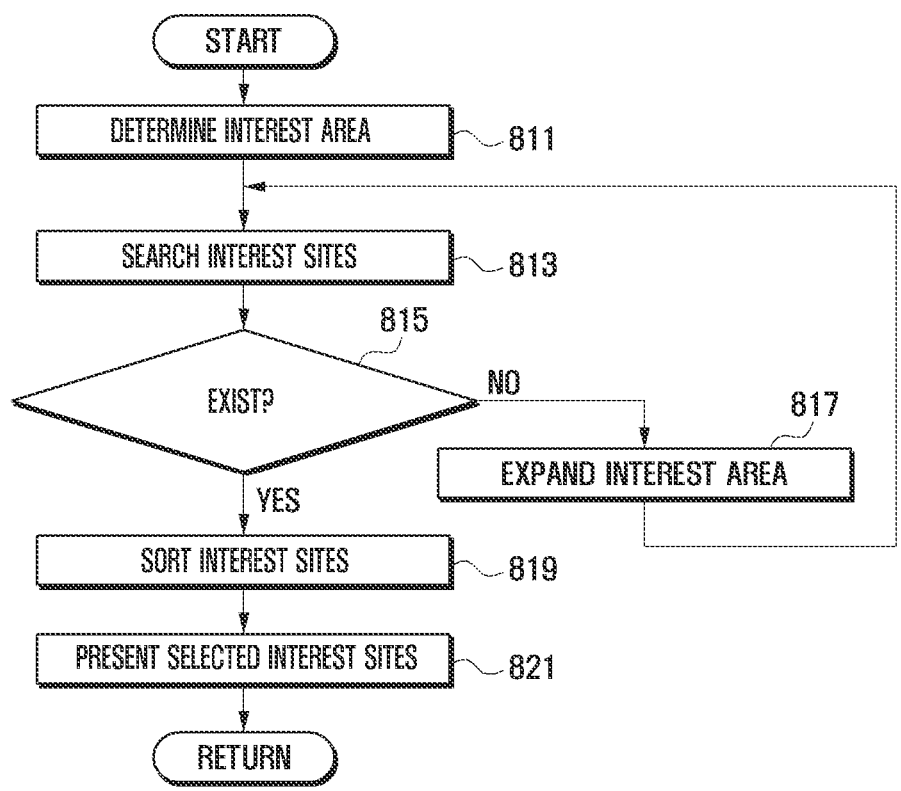
FIG. 8 is a flowchart illustrating an interest site presentation procedure of FIG. 3 according to an exemplary embodiment of the present invention.
Figure 9:
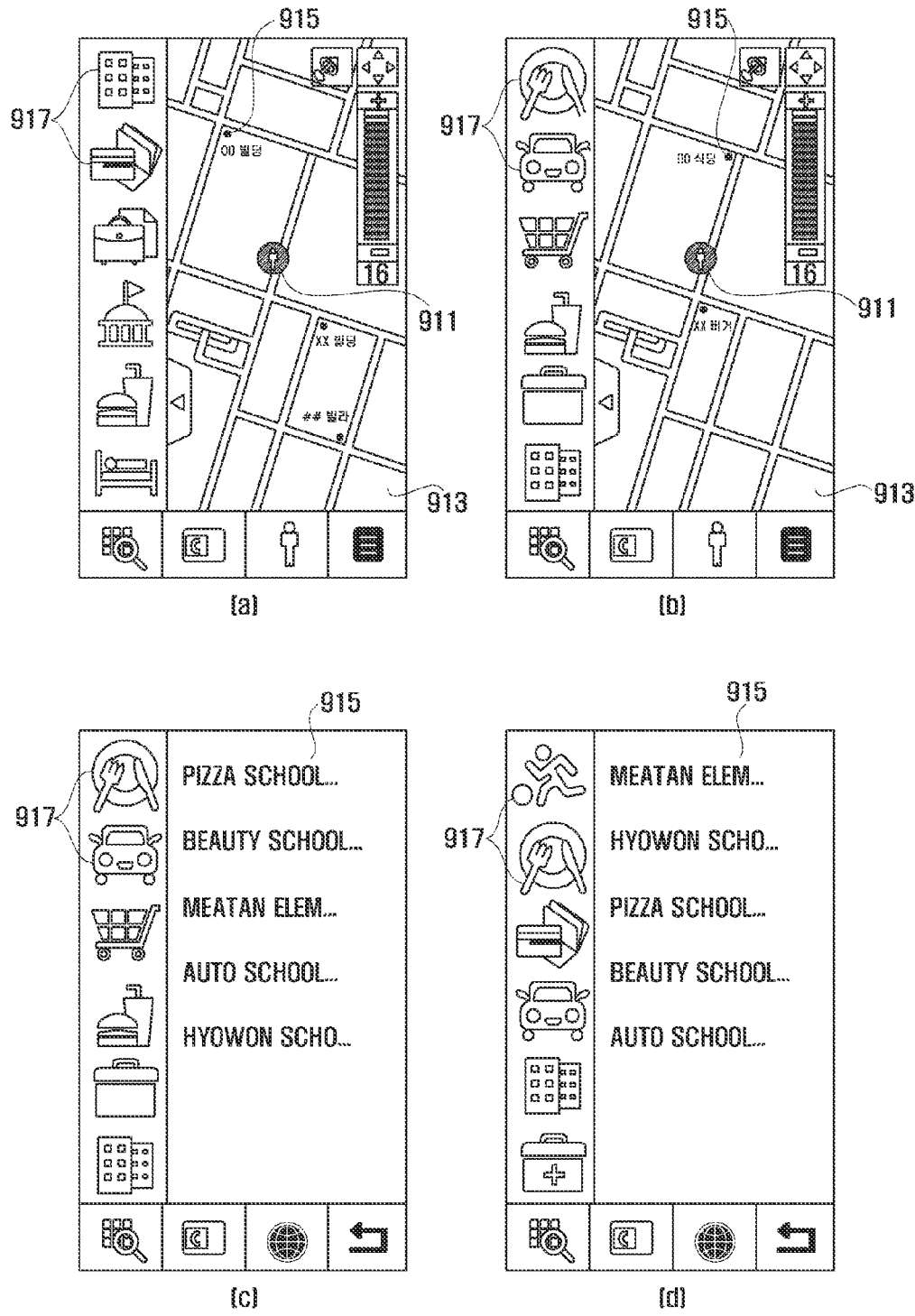
FIG. 9 is a diagram illustrating exemplary screen images for explaining a principle of the interest site presentation procedure of FIG. 8 according to an exemplary embodiment of the present invention.

FIG. 8 is a flowchart illustrating an interest site presentation procedure of FIG. 3 according to an exemplary embodiment of the present invention. FIG. 9 is a diagram illustrating exemplary screen images for explaining a principle of the interest site presentation procedure of FIG. 8 according to an exemplary embodiment of the present invention.

Referring to FIG. 8, in the interest site presentation procedure depicted, the control unit 140 first determines an interest area at step 811. The interest area can be determined as a vicinity of the current location. Also, when a point site is selected by means of the key input unit 170, the control unit 140 can determine the interest area around the selected point site. Next, the control unit 140 searches for interest sites within the interest area at step 813. Next, the control unit 140 determines whether an interest site exists within the interest area at step 815. If it is determined that no interest site exists in the interest area at step 815, the control unit 140 expands the interest area at step 817. After expanding the interest area, the control unit 140 repeats steps 813 and 815.

If it is determined that at least one interest site exists in the interest area at step 815, the control unit 140 sorts the interest sites at step 819. At this time, the control unit 140 compares a preference of each interest information with a threshold value to select at least one corresponding interest site of which the preference is equal to or greater than the threshold value. That is, the control unit 140 selects one of the interest sites in accordance with at least one of interest area, interest time, and interest category. Next, the control unit 140 controls the display unit 160 to present the selected interest site 915 as shown in FIG. 9 at step 821. At this time, the control unit 140 can control to also display the interest information on the interest site 915. Finally, the control unit 140 ends the interest site presentation procedure and returns to the next step 329 in FIG. 3.

For example, the control unit 140 can control such that the interest site 915 is presented on a map 913 displaying the interest area including the current location 911 in the form of an icon as shown in part (a) of FIG. 9. Here, the current location 911 can be replaced with a point site. At this time, the control unit 140 can display the interest categories 917 in a form of icons. The control unit 140 can sort the interest categories in order of preference levels of at least one of the interest area or the interest time. If another interest category 917 is selected, the control unit 140 retrieves the interest sites 915 belonging to the selected interest category and presents the interest sites 915 in the form of icons as shown in part (b) of FIG. 9.

The control unit 140 can also present the interest sites 915 in a form of a list as shown in part (c) of FIG. 9. At this time, the control unit 140 can present the interest categories 917 in the form of icons. Here, the control unit 140 can sort the interest categories 917 in an order of preference of at least one of the interest area or the interest time. If another category 917 is selected, the control unit reselects interest sites 915 belonging to the reselected interest category 917 and presents the reselected sites 915 in the form of a list as shown in part (d) of FIG. 9.

Returning to FIG. 3, the control unit 140 analyzes the current location and determines whether the location of the mobile terminal has changed at step 329. That is, the control unit 104 compares the current location information with the previous location information to determine whether the location has changed. If it is determined that the location of the mobile terminal has changed, the control unit 140 retrieves a preference route at step 331. At this time, the control unit 140 determines an interest area around the current location. Next, the control unit 140 searches for point sites within the interest area. At this time, the control unit 140 can determine a movement direction of the mobile terminal 100 according to the previous location information and current location information. The control unit 140 can also search for point sites in accordance with the movement direction of the mobile terminal 100. At this time, the control unit 140 can retrieve at least one point site. The control unit 140 further determines the preference route connecting the current location and a point site. At this time, the control unit 104 can determine at least one preference route.

Finally, the control unit 140 presents the preference route 927, as shown in FIG. 10, at step 333. That is, the control unit 140 presents the point sites 925, in the form of icons, on the map 923 displaying the interest area including the current location 921 of the mobile terminal 100. At this time, the control unit 140 can present a message prompting the terminal user to determine whether to present the preference route 927. If the terminal user determines to display the preference route 927 by means of the input unit 170, the control unit 140 presents the preference router 927 on the map.

As described above, the location information management method and apparatus of the present invention are capable of providing a preference route according to a current location of the mobile terminal. That is, although the terminal user does not select a search location manually, the mobile terminal 100 selects a destination according to the point site and provides a preference route from the current location to the destination location. Accordingly, it is possible to provide the terminal user with a user-preference route. The location information management method and apparatus of the present invention is advantageous to provide the terminal user with the information on the interest sites in accordance with the user preference without requiring manual selection by the user. Accordingly, it is possible to improve the user's convenience and utilization efficiency of the location information of the mobile terminal.

While the present invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method comprising:
    obtaining one or more point sites associated with a movement characteristic of an electronic device;
    determining a current position of the electronic device using a global positioning system unit;
    automatically selecting a point site of the one or more point sites to be a destination of a route in accordance with the movement characteristic of the electronic device;
    determining the route based on the current position and the selected point site; and
    presenting the determined route on a map via a display operably coupled to the electronic device,
    wherein the route connects the current position of the electronic device and the selected point site based in part on a location which the electronic device has passed,
    wherein the obtaining of the one or more point sites comprises:
        determining a stop region, based at least in part on a tarrying time of the electronic device at the stop region; and
        selecting a point within the stop region,
    wherein the determining of the route comprises determining a moving direction of the electronic device, and
    wherein the determined route connects the current position with the selected point site in accordance with the moving direction.

2. The method of claim 1, wherein the automatically selecting the point site of the one or more point sites comprises:
    determining a path associated with the electronic device, the path comprising a plurality of points and a plurality of path segments connecting the plurality of points; and
    selecting a point at which an angle between two of the plurality of path segments of the path is larger than a threshold angle from the plurality of points.

3. The method of claim 1, wherein the determining the route comprises:
    determining an interest area within a specified radius from the current position,
    wherein the determined route connects the current position with the selected point site, the point site being within the interest area.

4. The method of claim 1, wherein the presenting comprises presenting information corresponding to the selected point site on the map at least in part in a form of at least one of a graphical symbol and text.

5. The method of claim 1, further comprising:
    determining an interest area based on an information access to an interest site; and
    managing a preference level of the interest site based on at least one of time, category, location and contact information of the interest site.

6. The method of claim 5, wherein the determining of the interest area comprises determining the interest area based at least in part on at least one of the interest site and the preference level of the interest site.

7. The method of claim 5, wherein the presenting comprises presenting information corresponding to the interest site on the map at least in part in a form of at least one of a graphical symbol or text.

8. An apparatus comprising:
    a positioning unit configured to determine a current position of the apparatus;
    a control unit configured to:
        obtain one or more point sites associated with a movement characteristic of the apparatus,
        automatically select a point site of the one or more point sites to be a destination of a route in accordance with the movement characteristic of the apparatus, and
        determine the route based on the current position and the selected point site; and
    a display unit configured to present the determined route on a map,
    wherein the route connects the current position of the apparatus and the selected point site based in part on a location which the apparatus has passed,
    wherein the control unit comprises:
        a stop point determiner configured to:
            determine a stop region, based at least in part on a tarrying time of the apparatus at the stop region, and
        select a point within the stop region,
    wherein the determining of the route comprises determining a moving direction of the electronic device, and
    wherein the determined route connects the current position with the selected point site in accordance with the moving direction.

9. The apparatus of claim 8, wherein the control unit comprises:
    a route learner configured to:
        determine a path associated with the apparatus, the path comprising a plurality of points and a plurality of path segments connecting the plurality of points, and
        select a point at which an angle between two of the plurality of path segments of the path is larger than a threshold angle from the plurality of points.

10. The apparatus of claim 8,
    wherein the control unit is further configured to determine an interest area within a specified radius from the current position, and
    wherein the determined route connects the current position with the selected point site, the point site being within the interest area.

11. The apparatus of claim 8, wherein the control unit comprises an interest site detector configured to:
    determine an interest area, and
    manage a preference level of an interest site.

12. The apparatus of claim 11, wherein the control unit is further configured to determine the interest area based at least in part on at least one of the interest site and the preference level of the interest site.

13. The apparatus of claim 11, wherein the display unit is configured to present information corresponding to at least one of selected point sites and the interest site on the map at least in part in a form of at least one of a graphical symbol or text.

14. A non-transitory computer-readable medium storing instructions, when executed by one or more processors, cause the one or more processors to perform operations comprising:
    obtaining one or more point sites associated with a movement characteristic of an electronic device;
    determining a current position of the electronic device using a global positioning system unit;

automatically selecting a point site of the one or more point sites to be a destination of a route in accordance with the movement characteristic of the electronic device;

determining the route based on the current position and the selected point site; and presenting the determined route on a map via a display operably coupled to the electronic device, wherein the route connects the current position of the electronic device and the selected point site based in part on a location which the electronic device has passed, wherein the obtaining of the one or more point sites comprises:
   determining a stop region, based at least in part on a tarrying time of the electronic device at the stop region; and
   selecting a point within the stop region, wherein the determining of the route comprises determining a moving direction of the electronic device, and wherein the determined route connects the current position with the selected point site in accordance with the moving direction.

* * * * *